Jan. 14, 1930.　　　O. H. LUTHER　　　1,743,927

DIAL CONTROL

Filed Oct. 16, 1929　　2 Sheets-Sheet 1

WITNESSES
Jos. R. Ramie
O. T. Sperry

INVENTOR
Otto H. Luther
BY
Munn & Co.
ATTORNEYS

Jan. 14, 1930.   O. H. LUTHER   1,743,927
DIAL CONTROL
Filed Oct. 16, 1929   2 Sheets-Sheet 2

WITNESSES

INVENTOR
Otto H. Luther
BY
ATTORNEYS

Patented Jan. 14, 1930

1,743,927

UNITED STATES PATENT OFFICE

OTTO H. LUTHER, OF STAMFORD, CONNECTICUT

DIAL CONTROL

Application filed October 16, 1929. Serial No. 400,073.

This invention relates to control dials.

It is among the objects of the present invention to provide a novel and improved radio condenser control dial.

The present invention is particularly adapted for use in conjunction with radio condensers, the rotor plates of which are adapted for a plurality of revolutions. The invention provides an indicating dial for use in conjunction with such condensers, which will indicate through what revolution the plates are moving at any time during the operation. The dial further provides for the direct reading of wave lengths or frequencies in conjunction with the revolution indication.

In considering the present invention it will be understood that the device is not restricted for use in conjunction with radio condensers, but that the dial may be used in any device for indicating the angle of rotation of a moving part in conjunction with the number of revolutions which have been made from the starting point.

In connection with the present invention, it has been shown in the accompanying drawings in connection with a multi-range condenser as disclosed in my co-pending application, Serial No. 383,282, filed August 3, 1929.

Other important objects of the present invention include the provision of an indicating mechanism, which is simple in construction and operation and well designed to meet the demands of economic manufacture.

Other objects and features of the present invention will be apparent from a consideration of the following specification taken in conjunction with the accompanying drawings, in which Figure 1 is a top plan view partly broken away, of one embodiment of the present invention in conjunction with a multi-range condenser;

Figure 1:
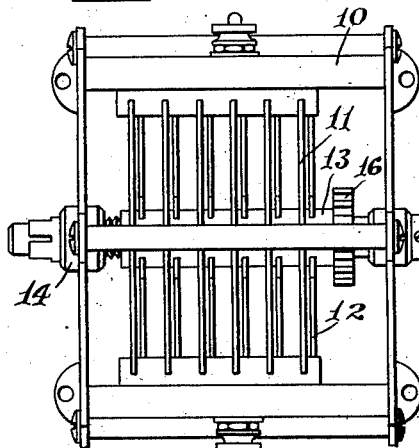
Figure 1:
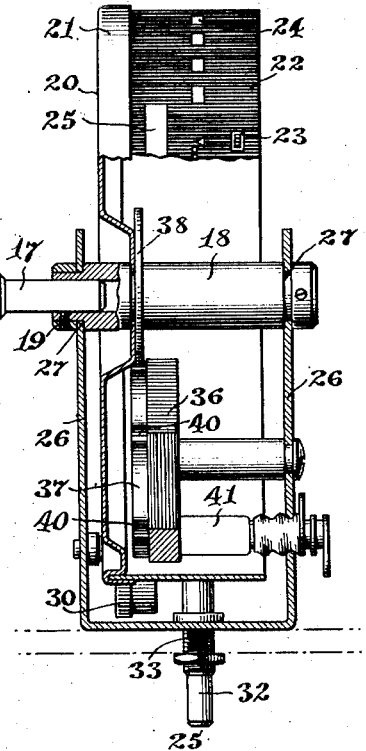
Figure 2:
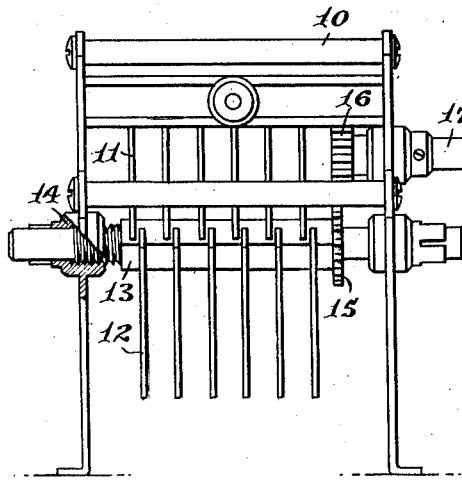
Fig. 2 is a side elevation of that form of the invention shown in Fig. 1.
Figure 2:
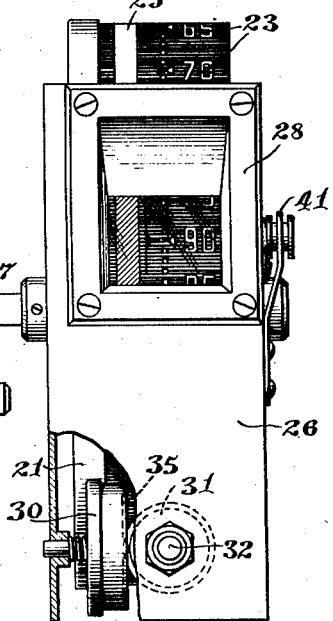

Referring more particularly to the drawings, it will be seen that the invention has been disclosed in conjunction with a radio condenser of the form disclosed in my co-pending application above referred to. The condenser includes the conventional chassis 10, within which stator plates 11 are provided in conjunction with rotor plates 12 carried upon a rotatable shaft 13, the end of which is journaled for threaded engagement with an internally threaded bearing 14, the arrangement being such that rotation of the shaft 13 rotates the plates 12 to vary the adjacent areas with respect to the plates 11, and, at the same time, moves the shaft 13 longitudinally to vary the space relation. Thus by providing for a plurality of revolutions of the shaft 13, a wide range in capacity characteristics of the condenser may be secured.

In the form of the condenser here shown, the shaft 13 is preferably driven through a gear 15 and associate gear 16 carried upon the forwardly extending operating shaft 17. In considering the present invention, it will be understood that the device is not confined to use in connection with this or any other type of condenser, but the form of the device here presented is particularly adapted for use in connection with the condenser, it being understood, however, that the device may be modified and various graduations used for accommodating its use to other types of apparatus.

The present form of the invention includes a central rotatable axis 18, which is adapted to be coupled with the shaft 17 in any suitable manner as by the reception of the shaft 17 therein and its securement as by screws 19. Mounted upon the axis 18, a circular plate 20 is provided, having a peripheral flange 21 forming a recess between the flange and the plate, within which an indicia-bearing strip 22 is received, whereby the plate and strip form a drum of the type now used in radio condenser dials. The strip 22 of the present invention, however, includes in conjunction with the usual indicia 23, and associate apertures 24 which may be arranged to indicate either frequency, wave lengths, or equivalent useful use, an elongated aperture 25, which, as will be hereinafter seen, is adapted to indicate the revolution for which the axis is turning. The strip 22 may be formed of any desired material. If desired, the strip may be formed of opaque paper and the indicia cut therethrough, or translucent paper may be provided with the indicia stencilled thereon. In the present embodiment, however, the strip is formed of a cellulose compound or the like, upon which the indicia is provided similar to the figures on a photographic film. The indicia 23, apertures 24, and the elongated aperture 25 are relatively transparent as compared with the translucent or opaque body of the strip.

Figure 3:
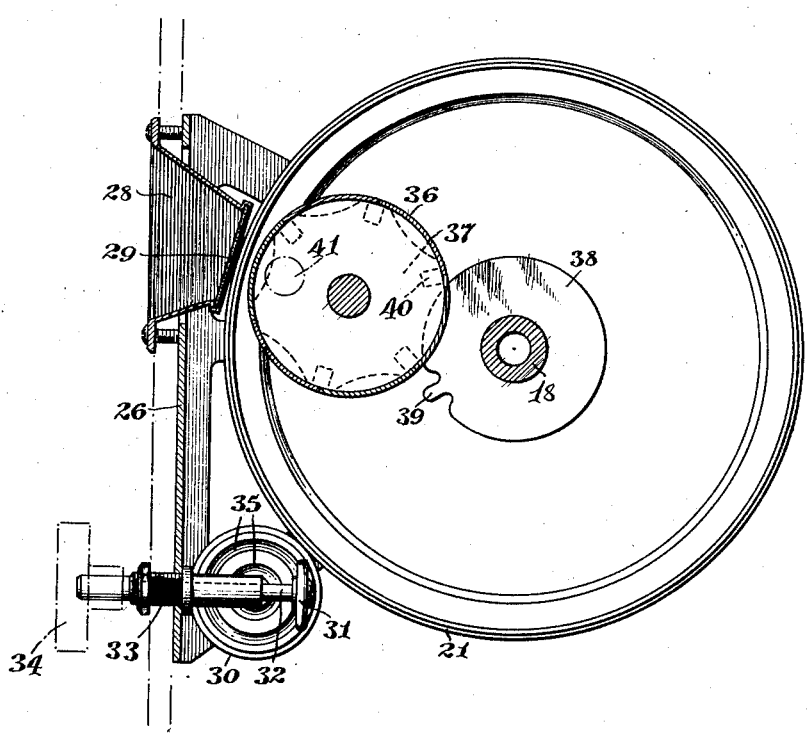
Fig. 3 is a vertical sectional view through that form of the invention shown in Figs. 1 and 2.

The condenser structure also preferably includes an external casing 26, which provides bearings for the axis 18, as at 27. The front of the casing 26 is provided with a viewing window structure 28, which preferably includes a ground glass window 29. As seen in Fig 3, the window structure 28 may be secured to the casing 26 by screws or the like in a manner to secure it to a control panel, the panel being indicated by the dotted lines in Figs. 1 and 3.

For rotating the drum assembly to impart rotation to the shaft 17 and to indicate the angularity of that rotation, a friction driving wheel 30, as best indicated in Fig. 3, is provided. The wheel 30 is mounted on an axis parallel with the axis 18, with its face contacting the external face of the flange 21, whereby rotation of the wheel 30 will impart responsive rotation on a reduced scale to the axis 18. For driving the wheel 30, a co-operating friction disk 31 is provided mounted upon a shaft 32, which extends through a bearing and which is adapted to receive an operating knob 34, as indicated in dotted lines in Fig. 3. The shaft 32 is longitudinally movable through its bearing 33 and the wheel 30 includes a plurality of grooves 35 which may receive the disk 31, whereby the speed ratios between the wheel 30 and disk 31 may be varied by longitudinal movement of the shaft in response to inward or outward movement of the knob 34. Thus through manipulation of the knob 34, the ratios of dial movement with movement of the knob, may be varied at will.

For indicating at the window 28, the revolution through which the drum is turning, there is provided an internal indicating wheel. The wheel includes a narrow face 36, which is divided into segments, each of which is of a different color. The segments are translucent and the narrow face of the wheel lies directly behind the elongated aperture 25 in the strip 22. For rotating the wheel, a Geneva gear 37 is provided, which is adapted to be actuated by a co-operating gear 38 carried by the axis 18. The gear 38 includes a projection 39, which upon each revolution of the axis 18, is received within a recess 40 of the Geneva gear, to impart to the wheel 36 a fraction rotation thereof, which rotation is adapted to present behind the aperture 25 and in alinement with the window 28, different color faces of the wheel. In the present form of the invention, the Geneva gear includes six of the recesses 40, together with six individually colored faces. Thus the device is adapted to indicate six different revolutions of the axis 18. It will be understood that the assembly may be modified in a manner to provide for the indication of any desired number of revolutions.

For rendering the indicias 23, 24 and 25 visible through the glass 29, a suitable illuminating bulb 41, which preferably extends within the wheel directly behind the glass 29, is provided. The arrangement is such that illumination from the bulb will pass through the colored face of the wheel and impart to the elongated aperture 25, a characteristic color to indicate at what revolution the wheel is turning. The illumination from the bulb 41 also illuminates directly the indicias 23 and 24 to render them visible through the ground glass.

In the operation of the device, the bulb 41 is illuminated and as herein described illuminates the indicia, and through the use of the wheel imparts a characteristic to the aperture 25. As the drum rotates, the indicias 23 and 24 present themselves to the glass and are visible therethrough while the wheel remains stationary, and the characteristic color imparted thereby is maintained until such time as a complete revolution of the drum has been completed, at which time the projection 39 engages one of the recesses 40 and the wheel is given a partial rotation, which presents a different color face between the bulb 41 and the glass 29, thus indicating to the operator that the drum is rotating in a different revolution from that previous.

In connection with the present invention, it will be understood that the device is applicable to various changes, modifications, and indicia arrangement to provide for the use of the device with various apparatus of either similar or different type from that herein indicated by the condenser shown. It will thus be seen that numerous changes, modifications and the full use of equivalents may be resorted to in the manufacture, use or sale of the device, without departing from the spirit or scope of the invention as outlined in the appended claims.

What is claimed is:

1. In a device of the character described, an indicia-bearing wheel adapted to make a plurality of rotations, and means associated therewith for indicating the rotation through which said wheel is moving, said means including a device for imparting a characteristic color to a portion of said wheel during each revolution thereof.

2. In a device of the character described, an indicia-bearing wheel adapted to make a plurality of rotations, and means associated therewith for indicating the rotation through which said wheel is moving, said means including a device for imparting a characteristic color to a portion of said wheel during each revolution thereof, said device comprising a wheel having variously colored faces, and an illuminating source associated with said wheel for directing colored light upon said first-mentioned wheel.

3. In a device of the character described, an indicia-bearing wheel adapted to make a plurality of rotations, means associated therewith for indicating the rotation through which said wheel is moving, said means including a device for imparting a characteristic color to a portion of said wheel during each revolution thereof, said device comprising a wheel having variously colored faces, an illuminating source associated with said wheel for directing colored light upon said first-mentioned wheel, and means for giving said second-mentioned wheel a partial rotation in response to each full rotation of said first-mentioned wheel.

4. In a device of the character described, an indicia-bearing wheel adapted to make a plurality of rotations, means associated therewith for indicating the rotation through which said wheel is moving, said means including a device for imparting a characteristic color to a portion of said wheel during each revolution thereof, said device comprising a wheel having variously colored faces, an illuminating source associated with said wheel for directing colored light upon said first-mentioned wheel, and means for giving said second-mentioned wheel a partial rotation in response to each full rotation of said first-mentioned wheel, said last-mentioned means including a Geneva gear associated with said second-mentioned wheel.

5. A device of the character described, including an indicia-bearing drum, means for illuminating said drum for rendering said indicia visible, and means for indicating the revolution through which said drum is turning, said last-mentioned means including a device for imparting color to said drum in accordance with the revolution through which the drum is turning.

6. A device of the character described, including an indicia-bearing drum, means for illuminating said drum for rendering said indicia visible, and means for indicating the revolution through which said drum is turning, said last-mentioned means including a device for imparting color to said drum in accordance with the revolution through which the drum is turning, said device including an internal wheel having variously colored faces.

7. A device of the character described, including an indicia-bearing drum, means for illuminating said drum for rendering said indicia visible, means for indicating the revolution through which the drum is turning, said last-mentioned means including a device for imparting color to said drum in accordance with the revolution through which the drum is turning, said device including an internal wheel having variously colored faces, and means for driving said internal wheel with the rotation of the drum.

8. A device of the character described, including an indicia-bearing drum, means for illuminating said drum for rendering said indicia visible, means for indicating the revolution through which the drum is turning, said last-mentioned means including a device for imparting color to said drum in accordance with the revolution through which the drum is turning, said device including an internal wheel having variously colored faces, and means for driving said internal wheel with the rotation of said drum, said means including a Geneva movement.

9. A device of the character described, including an indicia-bearing drum, means for illuminating said drum for rendering said indicia visible, means for indicating the revolution through which the drum is turning, said last-mentioned means including a device for imparting color to said drum in accordance with the revolution through which the drum is turning, said device including an internal wheel having variously colored faces, means for driving said internal wheel with the rotation of the drum, said means including a Geneva movement, and a source of illumination within said wheel for directing light through said wheel and drum.

10. A device of the character described, including an indicia-bearing drum, means for illuminating said drum for rendering said indicia visible, means for indicating the revolution through which the drum is turning, said last-mentioned means including a device for imparting color to said drum in accordance with the revolution through which the drum is turning, said device including an internal wheel having variously colored faces, means for driving said internal wheel with the rotation of the drum, said means including a Geneva movement, a source of illumination within said wheel for directing light through said wheel and drum, and means for turning said drum.

11. A device of the character described, including an indicia-bearing drum, means for illuminating said drum for rendering said indicia visible, means for indicating the revoluton through which the drum is turning, said last-mentioned means including a device for imparting color to said drum in accordance with the revolution through which the drum is turning, said device including an internal wheel having variously colored faces, means for driving said internal wheel with the rotation of the drum, said means including a Geneva movement, a source of illumination within said wheel for directing light through said wheel and drum, and means for turning said drum, said means including a friction wheel and speed-varying driving means for said wheel.

OTTO H. LUTHER.